Oct. 6, 1953 E. C. CORK 2,654,867

ELECTRICAL WAVE BAND PASS CIRCUITS

Filed Oct. 5, 1949 2 Sheets-Sheet 1

Inventor
EDWARD CECIL CORK
By Ralph E. Atherton
Attorney

Inventor
EDWARD CECIL CORK
By Ralph E. Atherton
Attorney

UNITED STATES PATENT OFFICE 2,654,867

ELECTRICAL WAVE BAND PASS CIRCUITS

Edward Cecil Cork, Ealing, London, England, assignor to Electric & Musical Industries Limited, Hayes, England, a company of Great Britain Application October 5, 1949, Serial No. 119,617
In Great Britain October 1, 1948

6 Claims. (Cl. 333—9)

This invention relates to electrical wave band-pass circuits.

Figure 1:
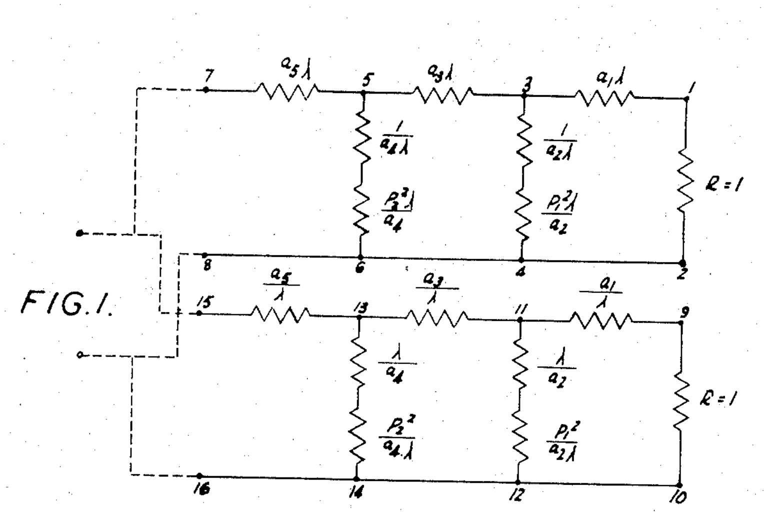

In the "Bell System Technical Journal" volume 16, 1937, pages 178 to 193, there is described the derivation of two finite networks which when connected in parallel form a band-pass circuit whose input impedance is theoretically a constant resistance at all frequencies. Figure 1 of the drawings illustrates an electrical wave band-pass circuit constructed as described with reference to Figures 5 and 6 in the aforesaid publication, the same symbols having been used in Figure 1 as in the publication, with $n$ however equal to 5 for convenience of description. The values of $a_1 \ldots a_5$ are determined in the manner described in the aforesaid publication, and as also described therein the quantities $P_1^2$ and $P_2^2$ are closely associated with the cut-off frequencies of the circuit, $\lambda$ is a symbol representing $$\frac{j\omega}{\omega_0}$$

and the circuit has terminating resistances R which are normalised to a value of unity. The terminals and the branch points of the first of the networks in Figure 1 are denoted by the references 1 . . . 8 and the terminals and branch points of the second of the networks are denoted by the references 9 . . . 16. The impedances $a_1\lambda \ldots a_5\lambda$ are inductances, and $a_1/\lambda \ldots a_5/\lambda$ are condensers, that is, the series impedances are each reactances of one sign, whilst the impedances in each of the branches 3, 4; 5, 6; 11, 12; and 13, 14 form tuned circuits.

A circuit such as illustrated in Figure 1 is suited for applications involving the transmission of low frequency electrical signals where the wave length is long compared with the physical dimensions of the components of the circuit. However when applications are considered involving the transmission of high frequency electrical signals, such as encountered for example in carrier wave television transmitters, several difficulties are encountered. For example the series impedances $a_5\lambda$ and $a_5/\lambda$ etc. are at high potential and ungrounded so that stray capacity to ground and phantom circuits affect the performance of the circuit, and the physical realisation of series impedances by means of transmission line sections is difficult. The circuit components are difficult to adjust and no mechanism exists in the circuit for attempting to annul stray capacities and inductances at junction points. Moreover, in the circuit illustrated the impedances are theoretically disposed at one point in space, a requirement which it is physically impossible to approach in constructing a circuit by means of transmission line sections.

The main object of the present invention is to provide an improved electrical wave band-pass circuit with a view to overcoming the above described difficulties in a circuit whose input impedance is effectively a constant resistance.

A further object of the present invention is to provide an improved electrical wave band-pass circuit wherein, by the use of the transforming action of transmission line sections, a circuit equivalent to alternate series and shunt impedances is provided by the employment of only shunt-connected impedances, and wherein means are provided for reducing the undesirable variation in the input admittance of the circuit due to variation in the electrical length of the sections with frequency.

The present invention utilises the transforming action of a quarter wavelength transmission line whereby a shunt impedance preceded by a quarter wavelength line is equivalent to a series impedance which is the inverse of the shunt impedance with respect to the characteristic impedance of the transmission line, over the range of frequencies for which the transformation is substantially accurate. It is therefore possible by a series of inversions of the impedances utilised in the circuit illustrated in Figure 1 to obtain a circuit which can be readily realised by means of transmission line sections and which nevertheless retains the property of having an effectively constant resistance over a range of frequencies.

Figure 2:
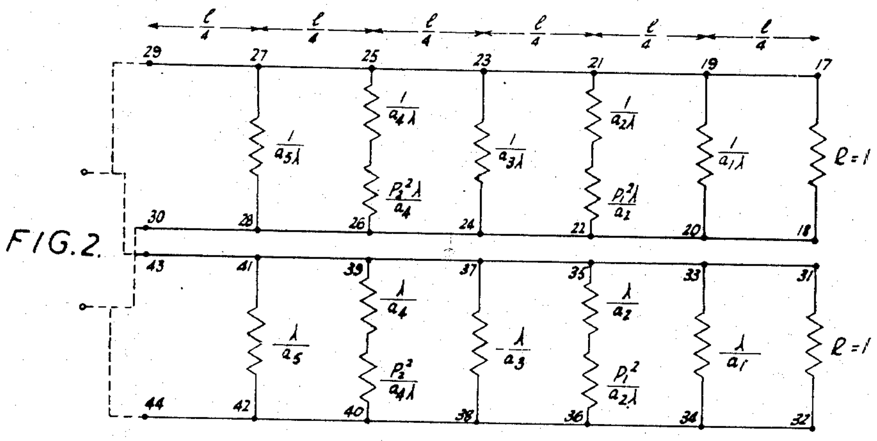
Figure 3:
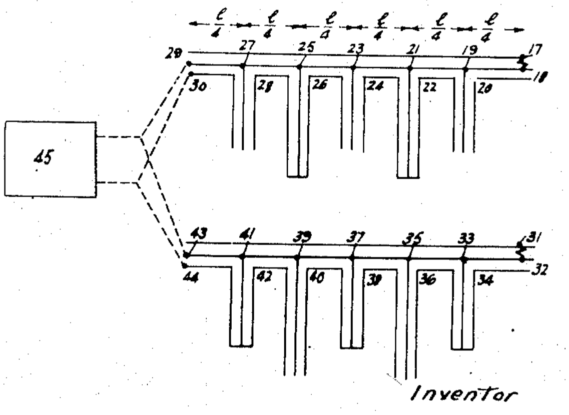
Figure 4:
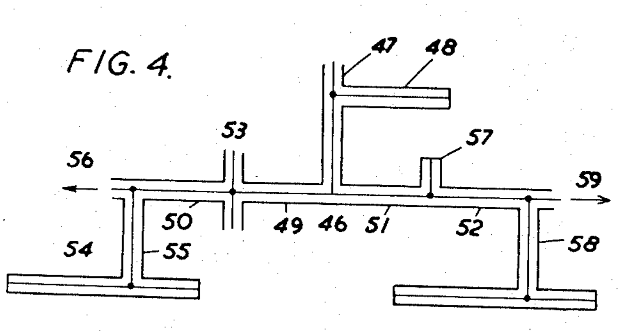
Figure 5:
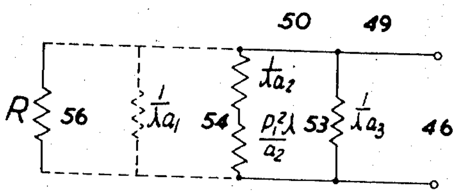

In order that the said invention may be clearly understood and readily carried into effect, the same will now be more fully described with reference to Figures 2 to 6 of the drawings in which:

Figure 2 illustrates diagrammatically one example of a band-pass circuit in accordance with the present invention, Figure 3 illustrates diagrammatically a practical realisation of this circuit employing co-axial transmission lines, Figure 4 illustrates another form of circuit constructed in accordance with the principle illustrated in Figure 2, and Figure 5 is a diagrammatic representation of part of Figure 4.

Referring to the drawings, the circuit illustrated in Figure 2 comprises two networks, the terminals and branch points of the first of which are indicated by the reference numerals 17 . . .

30, and the terminals and branch points of the second of which are indicated by the reference numerals 31 . . . 44. The points 17, 19, 21, 23, 25, 27 and 29 are disposed on one conductor of a transmission line, while the points 18, 20, 22, 24, 26, 28 and 30 are disposed in the other conductor of said transmission line, the characteristic impedance of the line being equal to R, the terminating impedance in Figure 1. The successive pairs of points on the conductors of said transmission line are separated by distances of a quarter wavelength at a predetermined frequency $\omega$, a quarter wavelength being denoted on the drawings by the symbol $l/4$ to avoid confusion with the previously defined symbol $\lambda$. The terminating resistance of the nework 17 . . . 30 connected between the terminals 17 and 18 is the inverse of the terminating resistance of the network 1 . . . 8 of Figure 1 with respect to the characteristic impedance of said transmission line and therefore in the present example has also the aforesaid value R. A shunt impedance is connected between the points 19, 20 having the value obtained by inverting with respect to R the series impedance $a_1/\lambda$ of Figure 1. Since the impedance to the right of the points 19, 20 is inverted at 21, 22 by reason of the quarter wavelength section of transmission line between the points 19, 21 the impedance to the right of points 21, 22 in Figure 2 is identical to the impedance to the right of points 3, 4 in Figure 1, within the range of frequencies about $\omega$ for which the transformation is substantially accurate, which will depend upon the frequency selectivity of the transmission line. Between the points 21 and 22 a shunt circuit is inserted comprising impedances equal in value to those between the points 3, 4 in Figure 1 and the impedance to the right of the points 21, 22 is inverted at 23 and 24 by the quarter wave sections of transmission line between the points 21, 23. A shunt impedance having the value $1/a_3\lambda$ which is the inverse of the series impedance $a_3\lambda$ between the points 3 and 5 in Figure 1, is connected between the points 23, 24 and the impedance to the right of the points 23, 24 is inverted at points 25, 26 by the transmission line section between the points 23, 25 so that the impedance at the points 25, 26 is the same as at the points 5, 6 in Figure 1 within the above-mentioned limits. A shunt circuit is connected between the points 25, 26 comprising impedances equal in value to the impedances between the points 5, 6 in Figure 1, and a shunt impedance having the value $1/a_5\lambda$ which is inverse of the series impedance $a_5\lambda$ in Figure 1 is connected between the points 27 and 28. It will now be apparent that by reason of the inversions effected by the transmission line sections between the points 25, 27 and 29, 31 the input impedance of the network 17 . . . 30, at the point 29, 30 is the same as that of the network 1 . . . 8 of Figure 1, within the aforesaid limits.

The points 31, 33, 35, 37, 39, 41 and 43 are disposed on one conductor of another transmission line, also of characteristic impedance R, and the points 32, 34, 36, 38, 40, 42 and 44 are disposed on the other conductor of said latter transmission line, and in the manner described with reference to the network 17 . . . 30 the network 31 . . . 44 is arranged to be equivalent to the network 9 . . . 16 of Figure 1. Therefore by connecting the terminals 29, 43 and 30, 44, in Figure 2 as indicated the networks together form a circuit whose input impedance is effectively a constant resistance over the range of frequencies about $\omega$ for which the transformations effected are substantially accurate. It will be appreciated that the circuit illustrated can be applied to the general case of $(2n+1)$ successive sections, in which case the co-efficients $a_1, a_2 \ldots a_{2n+1}$ and $P_1, P_2 \ldots P_n$ are determined in the manner described in the aforesaid publication.

Figure 3 diagrammatically shows a practical realisation of the circuit illustrated in Figure 2 wherein concentric transmission line sections are employed to provide the shunt impedances. Corresponding points in Figures 2 and 3 are indicated by the same reference numerals and in Figure 4 shunt impedances which are capacitative (i. e. those for which the symbol $\lambda$ appears in the denominator) are shown as open circuited sections while those which are inductive (i. e. those for which the symbol $\lambda$ appears in numerator) are shown as short circuit sections. The tuned circuits in the branches 21, 22 and 25, 26 are shown as short circuited sections which are arranged to have the requisite selectivity while the tuned circuits in the branches 35, 36 and 39, 40 are shown as open circuited sections. However it will be appreciated that, by making use of the known properties of transmission line sections, the shunt impedances which are shown as open circuited sections may be replaced by short circuited sections of different length and vice versa as may be most convenient or as required by the circuit constants, the method of illustration in Figure 3 having been chosen for convenience in order to illustrate that corresponding branches in the networks 17 . . . 30 and 31 . . . 44 have inverse properties. The fact that the shunt impedances in the circuit described are spaced at intervals of quarter wavelength along a transmission line has the advantage that stray inductances and capacities arising at the junction points can be made largely self-cancelling and some control of these undesirable quantities can be obtained.

The form of the invention illustrated in Figure 3 is especially applicable to television transmitters employing vestigial side band operation. For example, in such application the television transmitter, indicated diagrammatically in block form at 45, is connected across the terminals 29, 30 and 43, 44 in parallel and the resistance R connected between the points 17 and 18 forms the aerial load while the resistance R connected between the points 31, 32 is provided by a resistive load. The network 17 . . . 30 is arranged to have a band-pass characteristic such that it passes the side band frequencies which it is desired to broadcast while the network 31 . . . 44 is arranged to have a band-pass characteristic such that it passes the frequencies which it is desired to dissipate. It will of course be appreciated that the invention may find other applications and it will also be appreciated that the number of shunt impedances employed may be widely different from that illustrated in Figures 2 and 3 and that the terminating resistance R may have other forms than those described.

In the form of the circuit illustrated in Figure 4 which is also applicable to feeding the aerial of a television transmitter employing vestigial side band operation, the modulated carrier wave signals to be transmitted are fed to the entry point 46 of the filter by means of a feeder 47, having connected across it a parallel resonant circuit 48 which takes the form of short circuited quarter wavelength line and whose function will be referred to later. From the junction point 46 the signals are fed in parallel to two sequences of transmission line sections, one sequence comprising the sections 49 and 50 and the other sequence comprising the sections 51 and 52. The sections 49 . . . 52 have each an electrical length of one quarter wavelength of the carrier frequency. A capacity 53 is connected in parallel across the output end of the section 49 and a tuned circuit 54 is connected across the output end of the section 50. The capacity is in the form of two open circuited transmission line sections, as indicated, while the tuned circuit is in the form of a transmission line section short circuited at both ends and connected at an intermediate point to the end of the section 50 by a connecting section 55 having an electrical length of effectively one quarter wave length of the carrier frequency. It can be shown that the selectivity of the tuned circuit, that is the rate of change of its admittance with frequency, is dependent upon the location of the tapping point, said location being selected to obtain the appropriate value for the co-efficient P in the equivalent shunt branch across the ends of the section 50. The aerial load is connected across the output end of the section 50, said load being merely indicated by an arrow 56. An inductance 57, in the form of a short-circuited section, is connected across the output end of the section 51, while a tuned circuit 58 of similar construction to the tuned circuit 54 is connected across the output end of the section 52. A resistive load, which is indicated by the arrow 59, is also connected across the output end of the section 52. The capacity 53 is transformed by the section 49, assuming perfect transformation, into a series inductance at the entry point 46, while the inductance 57 is similarly transformed by the section 51 to appear at the entry point 46 as a series capacity. The resistive load thus dissipates the upper side band of the modulated carrier wave signals, while the aerial radiates the carrier and the lower side band.

Figure 5 illustrates the equivalent circuit of the part of the circuit shown in Figure 4, to the left of the entry point 46, similar notation to that employed in Figure 2 being utilised to indicate that Figure 5 can be regarded as a particular case of the more generalised circuit shown in Figure 2. The part shown dotted in Figure 5, is not actually included in the circuit shown in Figure 4, because the theoretical value of 1 $a_1\lambda$, is sufficiently small to allow it to be omitted, and no transformation is required for the load 56 since it is equal to its inverse. The input admittance of the circuit illustrated in Figure 5 (omitting the part shown dotted) for an input signal of such wave length that the electrical length $\theta$ of the sections 49 and 50 is less than 90° by a small angle $d\theta$ can be expressed by the equation $$A=\frac{Z_a^2}{Z_b^2\left\{Z_1+\frac{Z_a^2}{Z_2}\right\}}+\frac{j}{Z_b}\left\{1+\frac{Z_a^2}{Z_b^2\left\{Z_1+\frac{Z_a^2}{Z_2}\right\}}\left\{\frac{Z_1^2Z_b-Z_a(Z_a+Z_b)}{Z_a}\right\}\right\}d\theta$$

In this equation $Z_1$ represents the impedances 54 and 56 in parallel, $Z_2$ represents the impedance of 53, and $Z_a$ and $Z_b$ represent respectively the characteristic impedances of the sections 49 and 50. The first term in the right side of the equation is equal to or is a transformed value of the input conductance of the respective section of the circuit shown in Figure 1, depending on whether $Z_a$ equals $Z_b$ or not, the latter being the case in this example. The second term represents the first order error arising due to the departure of $\theta$ from 90° and in the general case is of the nature of a conductance and a susceptance in parallel. The conductance error is small and is neglected in the present example. To reduce the susceptance error, $Z_a$ and $Z_b$ are arranged to be different and to have such values in relation to $Z_1$ and $Z_2$ that the susceptance error becomes zero at a frequency near the edge of the band-pass which the part of the circuit in question has to handle. The susceptance error is also zero when $d\theta$ is zero. Therefore, over the desired side band the susceptance error is made small. Part of the circuit to the right of the entry point can be similarly analysed and the same expedient is adopted to reduce the first order susceptance error term. In this way it is arranged that the input impedance of the circuit at the entry point 46 is a substantially constant resistance over the required range of frequencies despite the variations in the electrical length of the transmission line sections with frequency. The tuned circuit 48 is employed to minimise residual error in the input impedance at the entry point 46 due, for example, to imperfect cancellation of stray inductances and capacities arranged at the junction points of the circuit.

The expedient described for reducing the first order error in the input susceptance can also be applied to Figure 3, since the analysis of Figure 5 (neglecting the dotted part) is evidently applicable to any section of the circuit shown in Figure 3. Moreover if the first order conductance error is significant it is possible to choose the values of $Z_a$ and $Z_b$ relative to $Z_1$ and $Z_2$ to make the conductance error zero at one frequency near the edge of the band-pass of the respective part of the circuit. It will also be zero when $d\theta$ is zero, and the conductance error can thus be made small over a desired range of frequencies. This of course does not allow $Z_a$ and $Z_b$ to be chosen with a view to reducing the susceptance error, but this term can then be reduced by introducing a tuned circuit whose selectivity slope is such as to compensate for this error.

What I claim is:

1. An electrical wave band-pass circuit comprising at least one pair of series-connected two-conductor transmission line sections having respectively input and output ends and each having an electrical length of $2n-1$ quarter wavelengths at one frequency in the pass band of the circuit, $n$ being any positive integer, a reactive impedance connected between the conductors at the output end of the first of said sections, a series resonant circuit tuned in said pass band and a terminating load connected mutually in parallel between the conductors at the output end of the other section, the characteristic impedances of said sections being different and related to the shunt impedances at the ends of the respective sections to substantially annul the reactive component at the input end of the first section at a frequency in said pass band different from said frequency, due to variation in the electrical length of the sections from $2n-1$ quarter wavelengths at said different frequency.

2. An electrical wave band-pass circuit comprising at least one pair of series-connected two-conductor transmission line sections having respectively input and output ends and each having an electrical length of $2n-1$ quarter wavelengths at one frequency in the pass band of the circuit, $n$ being any positive integer, a reactive impedance connected between the conductors at the output end of the first of said sections, a series resonant circuit tuned in said pass band and a terminating load connected mutually in parallel between the conductors at the output end of the other section, the characteristic impedance of said sections being different and related to the shunt impedances at the ends of the respective sections to substantially annul the resistive component at the input end of the first section at a frequency in said pass band different from said frequency, due to variation in the electrical length of the sections from $2n-1$ quarter wavelengths at the different frequency.

3. An electrical wave band-pass circuit comprising a pair of input terminals, two sequences of series-connected transmission line sections leading from said input terminals, each section having an electrical length of $2n-1$ quarter wavelengths at one frequency in the pass band of the circuit, $n$ being any positive integer, the line sections having input and output ends, impedances each of which is a reactance of one sign at all frequencies in the pass band of the circuit connected across the output ends of odd-numbered line sections in the sequences, series resonant circuits tuned in said pass-band and connected across the output ends of even-numbered line sections of the sequences, a resistive load connected across the output end of the last line section in each sequence, the band-pass circuit being equivalent to two parallel networks each comprising at least one series-connected reactance, at least one shunt-connected series tuned circuit, and a terminating load, the network elements being dimensioned to provide a substantially constant input resistance at all frequencies in said pass band.

4. An electrical wave band-pass circuit comprising a pair of input terminals, two sequences of series-connected transmission line sections leading from said input terminals, each section having an electrical length of $2n-1$ quarter wavelengths at one frequency in the pass band of the circuit, $n$ being any positive integer, the line sections having input and output ends, impedances each of which is a reactance of one sign at all frequencies in the pass band of the circuit connected across the output ends of odd-numbered line sections in the sequences, series resonant circuits tuned in said pass band and connected across the output ends of even-numbered line sections of the sequences, a resistive load connected across the output end of the last line section in each sequence, the band-pass circuit being equivalent to two parallel networks each comprising at least one series-connected reactance, at least one shunt-connected series tuned circuit, and a terminating load, the network elements being dimensioned to provide a substantially constant input resistance at all frequencies in said pass band, and the characteristic impedances of the individual line sections being dimensioned in relation to the network elements connected across the output ends of the respective line sections to reduce substantially to zero, at a frequency in said pass band different from the first-mentioned frequency, a reactive component which is added to the input resistance due to variation in the electrical length of the line sections with frequency.

5. An electrical wave band-pass circuit comprising a pair of input terminals, two sequences of series-connected transmission line sections leading from said input terminals, each section having an electrical length of $2n-1$ quarter wavelengths at one frequency in the pass band of the circuit, $n$ being any positive integer, the line sections having input and output ends, impedances each of which is a reactance of one sign at all frequencies in the pass band of the circuit connected across the output ends of odd-numbered line sections in the sequences, series resonant circuits tuned in said pass band and connected across the output ends of even-numbered line sections of the sequences, a resistive load connected across the output end of the last line section in each sequence, the band-pass circuit being equivalent to two parallel networks each comprising at least one series-connected reactance, at least one shunt-connected series tuned circuit, and a terminating load, the network elements being dimensioned to provide a substantially constant input resistance at all frequencies in said pass band, and the characteristic impedances of the individual line sections being dimensioned in relation to the network elements connected across the output ends of the respective line sections to reduce substantially to zero, at a frequency in said pass band different from the first-mentioned frequency, a variable resistive component which is added to said constant input resistance due to variation in the electrical length of the line sections with frequency.

6. An electrical wave band-pass circuit comprising transmission line sections each having an electrical length of $2n-1$ quarter wavelengths at one frequency in the passband of the circuit, $n$ being any positive integer, said line sections having respectively input and output ends and being connected in sequence, impedance elements shunt-connected across the output ends of said sections and including a reactance of one sign throughout the passband of the circuit connected across the end of each odd-numbered section of said sequence, and a resonant circuit tuned in said passband connected across the end of each even-numbered section in said sequence, the variation in the electrical length of the line sections with frequency adding unwanted variable components of resistance and reactance to the input impedance of said circuit, and said sections having different characteristic impedances dimensioned in relation to said impedance elements to reduce one of said variable components substantially to zero at a frequency in said passband differing from said first-mentioned frequency.

EDWARD CECIL CORK.

References Cited in the file of this patent

UNITED STATES PATENTS

| Number | Name | Date |
|---|---|---|
| 2,214,041 | Brown | Sept. 10, 1940 |
| 2,258,974 | Dagnall | Oct. 14, 1941 |
| 2,270,416 | Cork | Jan. 20, 1942 |
| 2,281,621 | Rust | May 5, 1942 |
| 2,432,094 | Fox | Dec. 9, 1947 |
| 2,433,368 | Johnson et al. | Dec. 30, 1947 |
| 2,438,367 | Keister | Mar. 23, 1948 |
| 2,588,226 | Fox | Mar. 4, 1952 |

FOREIGN PATENTS

| Number | Country | Date |
|---|---|---|
| 590,474 | Great Britain | July 18, 1947 |

OTHER REFERENCES

R. C. A. Review, vol. V, No. 3, January 1941 (pages 301–326).